(12) United States Patent
Ossin et al.

(10) Patent No.: US 9,661,480 B2
(45) Date of Patent: May 23, 2017

(54) TRIGGERING APPLICATION ACTION USING NON-STANDARD CONTROLS

(71) Applicants: Discovery Limited, Sandton (ZA); Cambridge Mobile Telematics, Cambridge, MA (US)

(72) Inventors: Ilan Ossin, Johannesburg (ZA); Samuel Ross Madden, Newton, MA (US)

(73) Assignees: Discovery Limited, Sandton (ZA); Cambridge Mobile Telematics, Cambridge, MA (US)

( * ) Notice: Subject to any disclaimer, the term of this patent is extended or adjusted under 35 U.S.C. 154(b) by 0 days.

(21) Appl. No.: 15/271,311

(22) Filed: Sep. 21, 2016

(65) Prior Publication Data

US 2017/0086038 A1 Mar. 23, 2017

Related U.S. Application Data

(60) Provisional application No. 62/221,161, filed on Sep. 21, 2015.

(51) Int. Cl.

| | |
|---|---|
| *H04M 1/66* | (2006.01) |
| *H04W 4/12* | (2009.01) |
| *H04W 4/02* | (2009.01) |
| *H04W 4/00* | (2009.01) |
| *H04W 24/08* | (2009.01) |
| *H04W 12/08* | (2009.01) |
| *H04M 1/725* | (2006.01) |
| *H04W 88/02* | (2009.01) |

(52) U.S. Cl.
CPC ......... *H04W 4/12* (2013.01); *H04M 1/72519* (2013.01); *H04W 4/008* (2013.01); *H04W 4/02* (2013.01); *H04W 12/08* (2013.01); *H04W 24/08* (2013.01); *H04W 88/02* (2013.01)

(58) Field of Classification Search
CPC ......... H04W 4/12; H04W 4/008; H04W 4/02; H04W 12/08; H04W 24/08; H04W 88/02; H04M 1/72519
USPC ....................................................... 455/411
See application file for complete search history.

(56) References Cited

U.S. PATENT DOCUMENTS

| | | | | |
|---|---|---|---|---|
| 2012/0009896 A1* | 1/2012 | Bandyopadhyay | ... | G06F 1/1643 455/411 |
| 2012/0284789 A1* | 11/2012 | Kim | ...................... | G06F 1/1694 726/19 |
| 2013/0069897 A1* | 3/2013 | Liu | ........................ | G06F 3/0488 345/173 |

(Continued)

*Primary Examiner* — Marcus Hammonds
(74) *Attorney, Agent, or Firm* — Fleit Gibbons Gutman Bongini & Bianco PL; Paul D. Bianco; Gary S. Winer

(57) ABSTRACT

A lock button of a mobile device with an iOS operating system, to be used by a user to effect an action when the mobile device is in the locked state, is enabled for other functions by executing an application on the mobile device. When the mobile device is in a locked state, the application is in a dormant mode. The OS of the mobile device monitors for a change of location of the device and/or for the receipt of a short range wireless data signal. Upon detecting either, the operating system communicates this to the application which in response enters a background mode and monitors the on/off state of a screen of the mobile device. If the screen state changes at least twice within a predetermined period of time, the application effects an action, such as sending a panic signal.

10 Claims, 2 Drawing Sheets

(56) References Cited

U.S. PATENT DOCUMENTS

| | | | |
|---|---|---|---|
| 2013/0207910 A1* | 8/2013 | Chiu | G06F 3/041 |
| | | | 345/173 |
| 2015/0264169 A1* | 9/2015 | Yim | H04M 1/72563 |
| | | | 455/411 |
| 2016/0269529 A1* | 9/2016 | Ding | H04M 1/0264 |

* cited by examiner

TRIGGERING APPLICATION ACTION USING NON-STANDARD CONTROLS

CROSS REFERENCE TO RELATED APPLICATIONS

This application claims the benefit of related U.S. Patent Application No. 62/221,161, filed Sep. 21, 2015, the contents of which are incorporated herein by reference in their entirety.

FIELD OF THE DISCLOSURE

The disclosure relates to a system and method for activating dormant applications in a mobile computing device, and more particularly, to activation of specific application actions using control buttons in a non-standard way.

BACKGROUND OF THE DISCLOSURE

The iOS operating system for mobile devices is created and developed by Apple Inc. and distributed exclusively for Apple hardware.

A mobile device with the operating system typically has a so-called locked state where the screen of the device is off and some of the applications may be executing in the background. However, in this locked state with the screen off, the user would first need to wake up the device by pressing a so-called "home" button which would switch on the screen and allow the user to then unlock the device to obtain access to the full functionality of the mobile device and access the relevant applications or features.

In the locked state, pressing a power on/off button will also switch on the screen. Holding the power on/off button down for an extended period of time will switch off the device. Pressing the power on/off button twice in quick succession will have no further effect.

SUMMARY OF THE DISCLOSURE

In accordance with an embodiment of the disclosure, a method of enabling a lock button of a mobile device with an iOS operating system to be used by a user to effect an action when the mobile device is in the locked state, includes executing an application on the mobile device wherein when the mobile device is in a locked state the application is in a dormant mode; monitoring by the operating system of the mobile device for a change of location of the device; monitoring by the operating system of the mobile device for the receipt of a short range wireless data signal; upon detecting a change of location of the device or upon receiving a short range wireless data signal the operating system communicates this to the application which in response enters a background mode and monitors the on/off state of a screen of the mobile device for any switching between an on state and an off state of the screen; and if the on/off state of the screen changes at least twice then the mobile application effects an action.

In variations thereof, the short range wireless data signal is preferably a Bluetooth Low Energy signal; the mobile device is typically a mobile telephone; and/or the action in one example is to transmit a panic data message to an external server, which panic message may include a location of the mobile device.

In another embodiment of the disclosure, a mobile device with an iOS operating system includes a memory for storing data therein; a long range communication module for communication over a cellular communication network; a short range communications module for receiving short range signals; a location determination module to determine the location of the mobile device; a user interface for receiving inputs from the user; a screen for displaying information to the user; and a processor for executing an operating system and an application thereon, the processor: monitoring by the operating system for a change of location of the device as detected by the location determination module; monitoring by the operating system for the receipt of a short range wireless data signal via the short range communications module; upon detecting a change of location of the device or upon receiving a short range wireless data signal the operating system communicates this to the application which in response enters a background mode and monitors the on/off state of the screen of the mobile device for any switching between an on state and an off state of the screen; if the on/off state of the screen changes a predetermined number of times within a predetermined period of time then effecting an action.

In variations thereof, the mobile device is typically a mobile telephone; the short range wireless data signal is a Bluetooth Low Energy signal; and/or the action in one example is to transmit a panic data message to an external server, which panic message may include a location of the mobile device.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION OF THE DISCLOSURE

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically.

The present disclosure relates to a method of enabling a lock button of a mobile device with an iOS operating system (iOS is a trademark of Apple Inc., of Cupertino, Calif.) to be used by a user to effect an action when the mobile device is in the locked state.

A mobile device with the operating system typically has a so-called locked state where the screen of the device is off and some of the applications may be executing in the background. However, in this locked state with the screen off, the user would first need to wake up the device by pressing a so-called "home" button which would switch on the screen and allow the user to then unlock the device to obtain access to the full functionality of the mobile device and access the relevant applications or features.

In the locked state, pressing a power on/off button will also switch on the screen. Holding the power on/off button down for an extended period of time will switch off the device. Pressing the power on/off button twice in quick succession will have no further effect.

Because access to the iOS operating system is not provided to application developers in a "locked out state", there is currently no method of enabling a double press of the power on/off button to be used by an application developer to execute an action. The present disclosure addresses this without requiring access to changing the iOS operating system.

The present disclosure relates to a method of enabling a lock button of a mobile device with an iOS operating system to be used by a user to effect a non-standard action with respect to the lock button when the mobile device is in the locked state, thereby improving a functionality of the mobile computing device.

Figure 1:
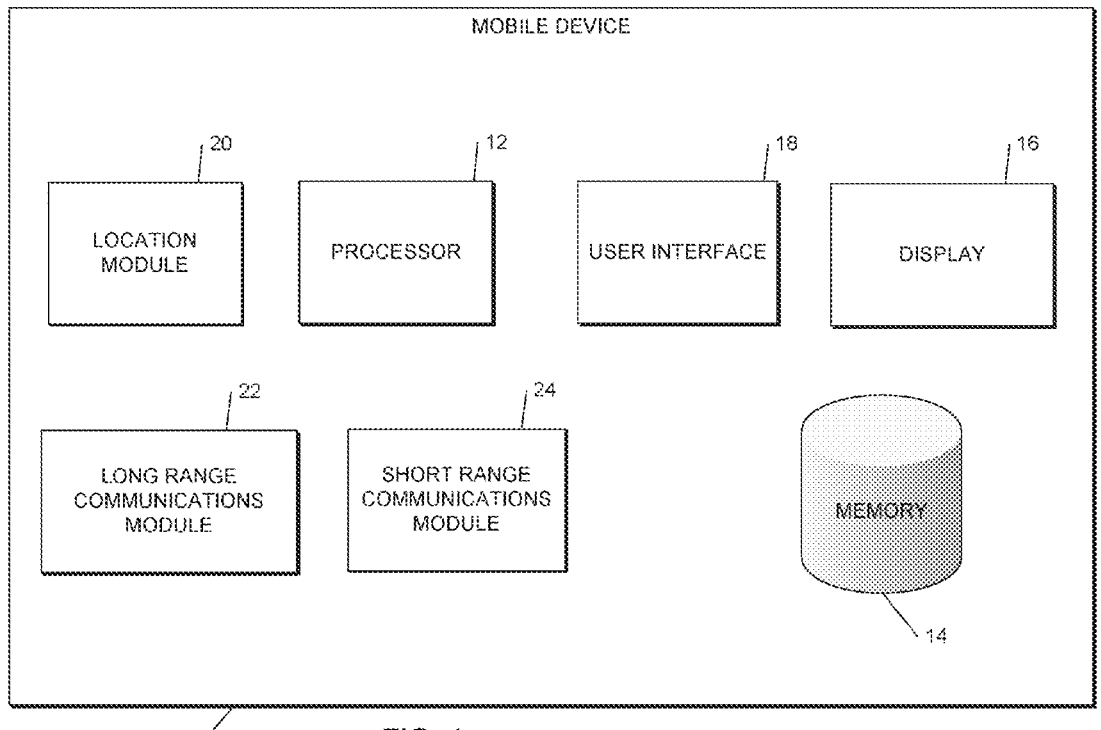
FIG. 1 is a block diagram illustrating an example mobile device for executing an application thereon to implement the methodologies described herein.
Figure 2:
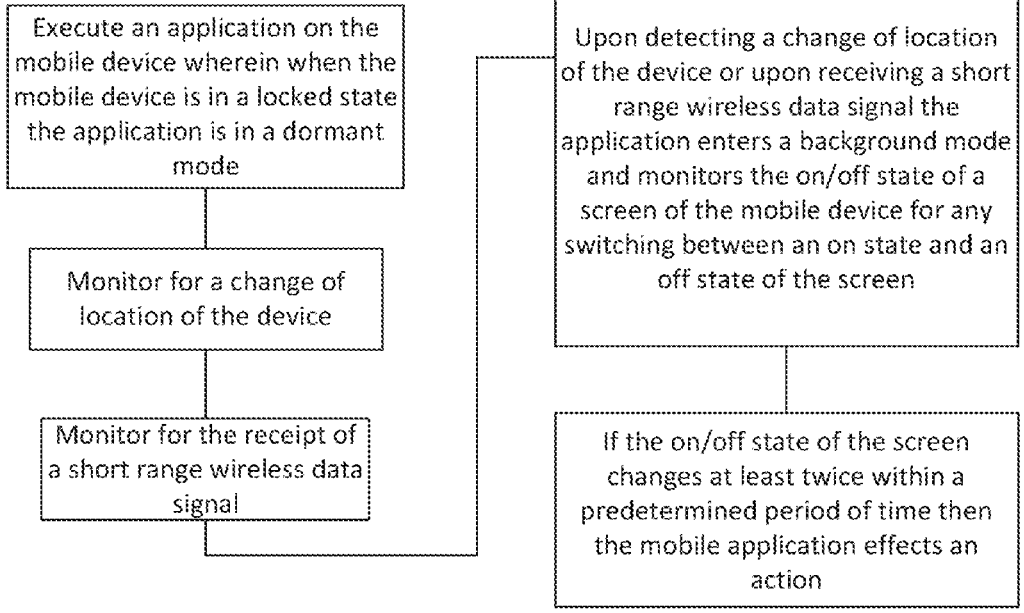
FIG. 2 is a block diagram illustrating an example embodiment method.
Figure 3:
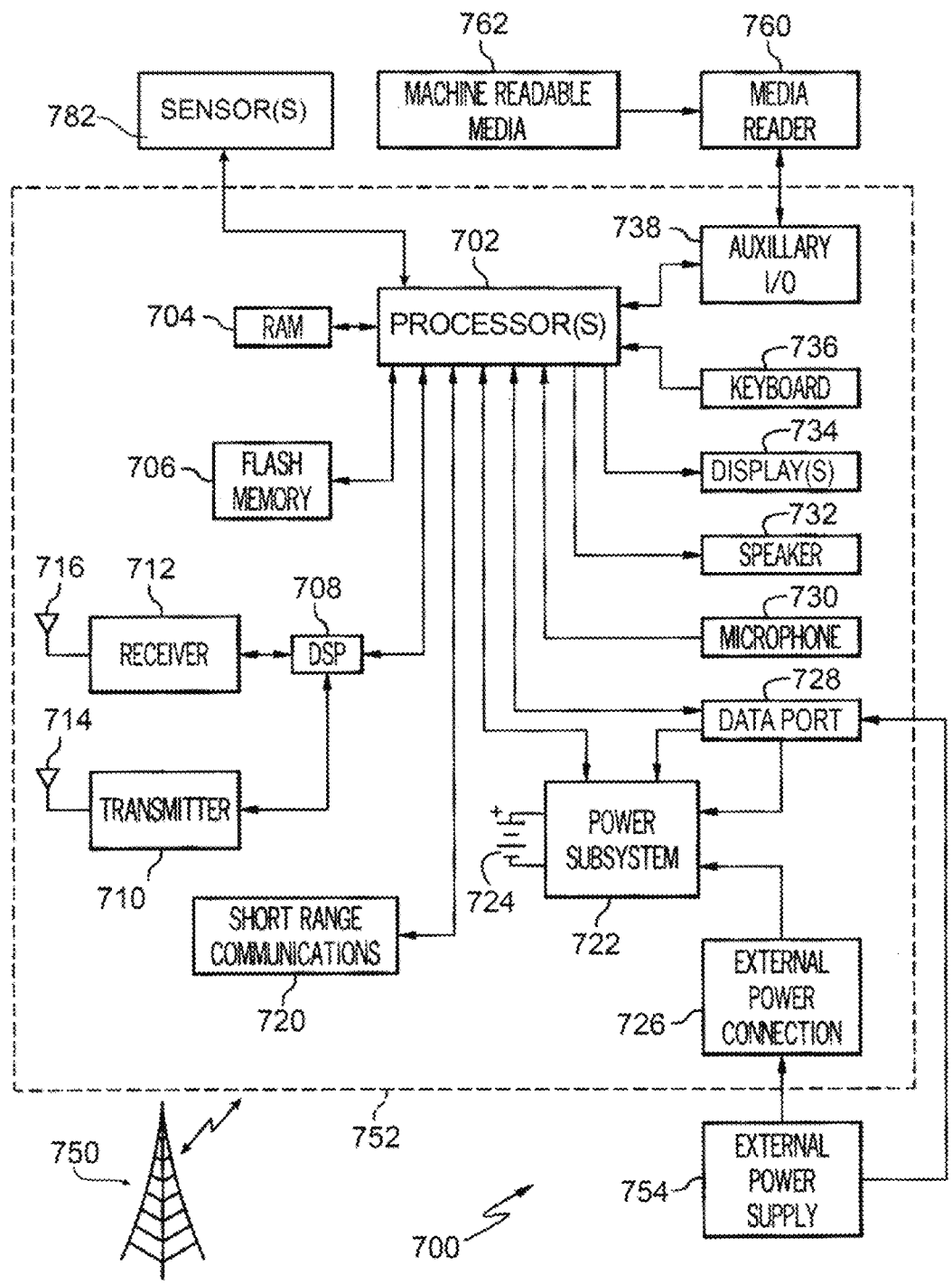
FIG. 3 is a block diagram of a mobile communication and computing device, some or all of which can be used to implement the disclosure.

Referring to FIGS. 1 and 3, a mobile device 10/700 is illustrated including a number of components. The mobile device 10/700 is typically a mobile telephone. A processor 12/702 and associated memory 14/704/706 is used for controlling the operation of the device. The processor 12 executes an iOS operating system for mobile devices created and developed by Apple Inc. and distributed exclusively for Apple hardware. The processor 12 is also able to execute applications which are executable software code often written by third parties for the mobile device 10. The device also includes a display 16/734 typically in the form of a screen.

A user interface 18 allows a user to input commands to the mobile device 10. The user interface 18 may include a touchscreen integrated with the display 16 as well as some other buttons which will be described in more detail below.

The device also includes a location module 20, a long range communications module 22/708-716 and a short range communications module 24/720 which will be described in more detail below.

The mobile device 10 has a so-called locked state where the screen 16 of the device is off and some of the applications may be executing in the background. In this state, the operating system limits what the applications can and cannot do.

In this locked state with the screen 16 off, the user would first need to wake up the device by pressing a so-called "home" button which would switch on the screen and allow the user to then unlock the device to obtain access to the full functionality of the mobile device.

In the locked state, pressing a power on/off button will also switch on the screen. Holding the power on/off button down for an extended period of time will switch off the device. Pressing the power on/off button twice in quick succession will toggle the screen on and off but will have no further effect.

The present disclosure addresses this in the following manner, which does not require altering the operating system of the mobile device 10, but operates within the current setup of the operating system, using functionality and hardware of the operating system in an unconventional manner.

To achieve this, an application is executed on the processor 12 so that when the mobile device 10 is in a locked state, the application is in dormant mode or state. Even in the dormant state, the operating system executing on the mobile device 10 does monitor for certain events.

How this works is that the operating system monitors for these changes such as "significant location change" or picking up a BLE tag and when the operating system picks this up, the application is "subscribed" to those services, and the operating system communicates an instruction to the application that this has occurred and thereby "wakes" up the application which enters into a background mode.

In any event, particularly, what is being monitored for are: a change of location of the device; and/or the receipt of a short range wireless data signal via the short range communications module 24. Regarding a change of location of the device, this is detected by the location module 20 which typically uses the GPS location of the mobile device 10. The change of location that is being referred to is typically a significant change of location such as 1 km and not a small change of location.

The operating system starts the Significant-Change Location Service which provides accuracy that is sufficient for most applications and represents a power-saving alternative to the standard location service. The service uses Wi-Fi to determine the location of the device and reports changes in that location, allowing the system to manage power usage much more aggressively than it could otherwise. The significant-change location service can also wake up an iOS app that is currently suspended or not running in order to deliver new location data.

Regarding the receipt of a short range wireless data signal, in one example embodiment this refers to a Bluetooth low energy signal that is received from another device that is periodically transmitting such signals.

Upon detecting either a change of location of the device or upon receiving a short range wireless data signal the operating system communicates an instruction to an application of the disclosure that this change or event has occurred, and in response to which the application enters a background mode in which the application monitors the on/off state of the screen 16 of the mobile device 10 for any switching between an on state and an off state of the screen 16. If the on/off state of the screen 16 changes at least twice, or some other predetermined number of times or pattern of changes, within a predetermined period of time, for example within a short predetermined period of time then, in accordance with the disclosure, the mobile application effects a desired predetermined action. As such, the disclosure adds a useful functionality to a mobile or other computing device without requiring a change to the operating system. In effect, the disclosure enables increasing the scope of an application programming interface within the device, and uses controls of the device in an unconventional and non-standard way.

This is because the mobile device 10 includes a power on/off button which is used to switch the device on and off. However, when the device 10 is in the locked state, pressing the on/off button rapidly simply toggles the screen from on to off or from off to on as the case may be. Thus if the on/off state of the screen 16 changes at least twice within a short predetermined period of time, this indicates that the power on/off button has been pressed twice in relatively quick succession, typically within milliseconds or less than a second.

Once the application determines the aforedescribed screen state change, it executes an action even whilst in the background mode. This is due to the fact that within the restraints of the current iOS operating system, it is possible for an application executing in background mode to monitor if the screen has been switched on or off but it is not possible for an application to otherwise determine if the power on/off button has been depressed.

While the disclosure has been described in the context of a mobile computing and communications device executing the iOS operating system, other operating systems, such as the ANDROID operating system (a trademark of Google Inc., of Mountain View, Calif.) have similar features, and the disclosure can be carried out on these other operating systems, as would be understood by one skilled in the art.

It will further be appreciated that in accordance with the disclosure, by monitoring the status of the screen, the application can ascertain if the power on/off button has been depressed. Regarding the action that is executed by the application, it will be appreciated that this could be any suitable action.

One example action or implementation is in the use of vehicle tracking technology, where an application of the disclosure executing on the mobile device 10 is used to track the location of the mobile device 10 either alone or in conjunction with an external tag to which the mobile device 10 communicates, typically via Bluetooth. This would occur in a scenario such as is described in commonly assigned copending PCT application PCT/IB2014/065736, the contents of which are incorporated herein by reference.

In this example of the disclosure, the power on/off button can be used as a panic button for the user, for example if they are being car jacked. In this scenario, the user would press the power on/off button twice and the action implemented by the application would be to send a panic message via the long range communications module 22 to an external server. The panic message will typically include a location of the mobile device 10 as obtained from the location module 20 at the time of the panic.

It will be appreciated that the methodology described above effectively allows the power on/off button of a mobile device with an iOS operating system to be used to effect an action, even when the device is in a locked state, and in a manner which is not contemplated or provided for by the operating system specification.

Example Mobile Computing and Communications System

FIG. 3, is a block diagram of an electronic device and associated components 700, which can be used in carrying out the disclosure. In this example, an electronic device 752 is a wireless two-way communication device with voice and data communication capabilities. Such electronic devices communicate with a wireless voice or data network 750 using a suitable wireless communications protocol. Wireless voice communications are performed using either an analog or digital wireless communication channel. Data communications allow the electronic device 752 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 752 is an example electronic device that includes two-way wireless communications functions. Such electronic devices incorporate communication subsystem elements such as a wireless transmitter 710, a wireless receiver 712, and associated components such as one or more antenna elements 714 and 716. A digital signal processor (DSP) 708 performs processing to extract data from received wireless signals and to generate signals to be transmitted. The particular design of the communication subsystem is dependent upon the communication network and associated wireless communications protocols with which the device is intended to operate.

The electronic device 752 includes a microprocessor 702 that controls the overall operation of the electronic device 752. The microprocessor 702 interacts with the above described communications subsystem elements and also interacts with other device subsystems such as flash memory 706, random access memory (RAM) 704, auxiliary input/output (I/O) device 738, data port 728, display 734, keyboard 736, speaker 732, microphone 730, a short-range communications subsystem 720, a power subsystem 722, and any other device subsystems.

A battery 724 is connected to a power subsystem 722 to provide power to the circuits of the electronic device 752. The power subsystem 722 includes power distribution circuitry for providing power to the electronic device 752 and also contains battery charging circuitry to manage recharging the battery 724. The power subsystem 722 includes a battery monitoring circuit that is operable to provide a status of one or more battery status indicators, such as remaining capacity, temperature, voltage, electrical current consumption, and the like, to various components of the electronic device 752.

The data port 728 of one example is a receptacle connector 104 or a connector that to which an electrical and optical data communications circuit connector 700 engages and mates, as described above. The data port 728 is able to support data communications between the electronic device 752 and other devices through various modes of data communications, such as high speed data transfers over an optical communications circuits or over electrical data communications circuits such as a USB connection incorporated into the data port 728 of some examples. Data port 728 is able to support communications with, for example, an external computer or other device.

Data communication through data port 728 enables a user to set preferences through the external device or through a software application and extends the capabilities of the device by enabling information or software exchange through direct connections between the electronic device 752 and external data sources rather then via a wireless data communication network. In addition to data communication, the data port 728 provides power to the power subsystem 722 to charge the battery 724 or to supply power to the electronic circuits, such as microprocessor 702, of the electronic device 752.

Operating system software used by the microprocessor 702 is stored in flash memory 706. Further examples are able to use a battery backed-up RAM or other non-volatile storage data elements to store operating systems, other executable programs, or both. The operating system software, device application software, or parts thereof, are able to be temporarily loaded into volatile data storage such as RAM 704. Data received via wireless communication signals or through wired communications are also able to be stored to RAM 704.

The microprocessor 702, in addition to its operating system functions, is able to execute software applications on the electronic device 752. A predetermined set of applications that control basic device operations, including at least data and voice communication applications, is able to be installed on the electronic device 752 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 752 through, for example, the wireless network 750, an auxiliary I/O device 738, Data port 728, short-range communications subsystem 720, or any combination of these interfaces. Such applications are then able to be installed by a user in the RAM 704 or a non-volatile store for execution by the microprocessor 702.

In a data communication mode, a received signal such as a text message or web page download is processed by the communication subsystem, including wireless receiver 712 and wireless transmitter 710, and communicated data is provided the microprocessor 702, which is able to further process the received data for output to the display 734, or alternatively, to an auxiliary I/O device 738 or the Data port 728. A user of the electronic device 752 may also compose data items, such as e-mail messages, using the keyboard 736, which is able to include a complete alphanumeric keyboard or a telephone-type keypad, in conjunction with the display 734 and possibly an auxiliary I/O device 738. Such composed items are then able to be transmitted over a communication network through the communication subsystem.

For voice communications, overall operation of the electronic device 752 is substantially similar, except that received signals are generally provided to a speaker 732 and signals for transmission are generally produced by a microphone 730. Alternative voice or audio I/O subsystems, such as a voice message recording subsystem, may also be implemented on the electronic device 752. Although voice or audio signal output is generally accomplished primarily through the speaker 732, the display 734 may also be used to provide an indication of the identity of a calling party, the duration of a voice call, or other voice call related information, for example.

Depending on conditions or statuses of the electronic device 752, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 720 provides for data communication between the electronic device 752 and different systems or devices, which need not necessarily be similar devices. For example, the short-range communications subsystem 720 includes an infrared device and associated circuits and components or a Radio Frequency based communication module such as one supporting Bluetooth® communications, to provide for communication with similarly-enabled systems and devices, including the data file transfer communications described above.

A media reader 760 is able to be connected to an auxiliary I/O device 738 to allow, for example, loading computer readable program code of a computer program product into the electronic device 752 for storage into flash memory 706. One example of a media reader 760 is an optical drive such as a CD/DVD drive, which may be used to store data to and read data from a computer readable medium or storage product such as computer readable storage media 762. Examples of suitable computer readable storage media include optical storage media such as a CD or DVD, magnetic media, or any other suitable data storage device. Media reader 760 is alternatively able to be connected to the electronic device through the Data port 728 or computer readable program code is alternatively able to be provided to the electronic device 752 through the wireless network 750.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

What is claimed is:

1. A method of enabling a lock button of a mobile device with an operating system to be used by a user to effect an action when the mobile device is in the locked state, the method including:
    executing an application on the mobile device wherein when the mobile device is in the locked state, the application is in a dormant mode;
    monitoring by the operating system of the mobile device for a change of location of the mobile device during the locked state;
    monitoring by the operating system of the mobile device for the receipt of a short range wireless data signal during the locked state;
    notifying the application upon detecting a change of location of the mobile device or upon receiving a short range wireless data signal;
    entering a background mode and monitoring the on/off state of a screen of the mobile device for any switching between an on state and an off state of the screen in response to the notification; and
    when the on/off state of the screen changes at least twice within a predetermined period of time then the application executes an action.

2. A method according to claim 1 wherein the short range wireless data signal is a Bluetooth Low Energy signal.

3. A method according to claim 1 wherein the mobile device is typically a mobile telephone.

4. A method according to claim 1 wherein the action is to transmit a panic data message to an external server.

5. A method according to claim 4 wherein the panic message includes a location of the mobile device.

6. A mobile device with an operating system, the mobile device including: a memory for storing data therein;
    a long range communication module for communication over a cellular communication network;

a short range communications module for receiving short range signals;

a location determination module to determine the location of the mobile device;

a user interface for receiving inputs from the user;

a screen for displaying information to the user; and a processor for executing an operating system and an application thereon, the processor:

executing the application on the mobile device wherein when the mobile device is in a locked state, the application is in a dormant mode;

monitoring by the operating system for a change of location of the device as detected by the location determination module during the locked state;

monitoring by the operating system for the receipt of a short range wireless data signal via the short range communications module during the locked state;

notifying the application upon detecting a change of location of the mobile device or upon receiving a short range wireless data signal;

entering a background mode and monitoring the on/off state of the screen of the mobile device for any switching between an on state and an off state of the screen in response to the notification; and if the on/off state of the screen changes a at least twice within a predetermined period of time then the application executes an action.

7. A system according to claim 6 wherein the short range wireless data signal is a Bluetooth Low Energy signal.

8. A system according to claim 6 wherein the mobile device is typically a mobile telephone.

9. A system according to claim 6 wherein the action is to transmit a panic data message to an external server.

10. A system according to claim 9 wherein the panic message includes a location of the mobile device.

* * * * *